(12) United States Patent
Ohsawa et al.

(10) Patent No.: US 9,007,496 B2
(45) Date of Patent: Apr. 14, 2015

(54) SOLID-STATE IMAGING DEVICE AND CAMERA MODULE

(71) Applicant: Kabushiki Kaisha Toshiba, Minato-ku (JP)

(72) Inventors: Shinichi Ohsawa, Machida (JP); Junichi Hosokawa, Yokohama (JP); Yuki Koguchi, Kamakura (JP); Masahiko Nozaki, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

(21) Appl. No.: 14/170,928

(22) Filed: Feb. 3, 2014

(65) Prior Publication Data

US 2015/0002706 A1      Jan. 1, 2015

(30) Foreign Application Priority Data

Jun. 27, 2013    (JP) ................. 2013-135373

(51) Int. Cl.
*H04N 9/64* (2006.01)
*H04N 5/367* (2011.01)

(52) U.S. Cl.
CPC ................. *H04N 5/3675* (2013.01)

(58) Field of Classification Search
USPC ........................................ 348/246
See application file for complete search history.

(56) References Cited

U.S. PATENT DOCUMENTS

| 7,206,020 | B2 * | 4/2007 | Kato ............................. 348/247 |
| 8,411,175 | B2 | 4/2013 | Sato et al. |
| 2005/0219390 | A1 * | 10/2005 | Tajima et al. ................. 348/246 |
| 2009/0091642 | A1 * | 4/2009 | Minema et al. ............... 348/246 |
| 2011/0234842 | A1 | 9/2011 | Ishiga |
| 2012/0133804 | A1 * | 5/2012 | Kim ............................. 348/246 |
| 2012/0250994 | A1 | 10/2012 | Shinozaki et al. |

FOREIGN PATENT DOCUMENTS

| JP | 2011-15157 | 1/2011 |
| JP | 2011-109572 | 6/2011 |
| JP | 2011-135566 | 7/2011 |
| JP | 2012-217139 | 11/2012 |

* cited by examiner

*Primary Examiner* — Anthony J Daniels
(74) *Attorney, Agent, or Firm* — Oblon, McClelland, Maier & Neustadt, L.L.P.

(57) ABSTRACT

According to one embodiment, a solid-state imaging device includes a signal level comparing circuit. The signal level comparing circuit compares the levels among the signals of first peripheral pixels, the levels among the signals of second peripheral pixels, the levels among the signals of third peripheral pixels. The first peripheral pixels are arranged with the pixels for colors other than the color for the target pixel interposed between the first peripheral pixels and the target pixel. The second peripheral pixels are disposed on extension lines in directions from the target pixel to the first peripheral pixels, and the third peripheral pixels are disposed between the second peripheral pixels.

20 Claims, 7 Drawing Sheets

FIG.5

| Rf7 | Gr | Re7 | Gr | Rf6 | Gr | Re6 | Gr | Rf5 |
|---|---|---|---|---|---|---|---|---|
| Gb | B | Gb | B | Gb | B | Gb | B | Gb |
| Re5 | Gr | Rd7 | Gr | Rd6 | Gr | Rd5 | Gr | Re4 |
| Gb | B | Gb | B | Gb | B | Gb | B | Gb |
| Rf4 | Gr | Rd4 | Gr | Rc | Gr | Rd3 | Gr | Rf3 |
| Gb | B | Gb | B | Gb | B | Gb | B | Gb |
| Re3 | Gr | Rd2 | Gr | Rd1 | Gr | Rd0 | Gr | Re2 |
| Gb | B | Gb | B | Gb | B | Gb | B | Gb |
| Rf2 | Gr | Re1 | Gr | Rf1 | Gr | Re0 | Gr | Rf0 |

FIG.6

| Rf7 |  | Re7 |  | Rf6 |  | Re6 |  | Rf5 |
|---|---|---|---|---|---|---|---|---|
|  |  |  |  |  |  |  |  |  |
| Re5 |  | Rd7 |  | Rd6 |  | Rd5 |  | Re4 |
|  |  |  |  |  |  |  |  |  |
| Rf4 |  | Rd4 |  | Rc |  | Rd3 |  | Rf3 |
|  |  |  |  |  |  |  |  |  |
| Re3 |  | Rd2 |  | Rd1 |  | Rd0 |  | Re2 |
|  |  |  |  |  |  |  |  |  |
| Rf2 |  | Re1 |  | Rf1 |  | Re0 |  | Rf0 |

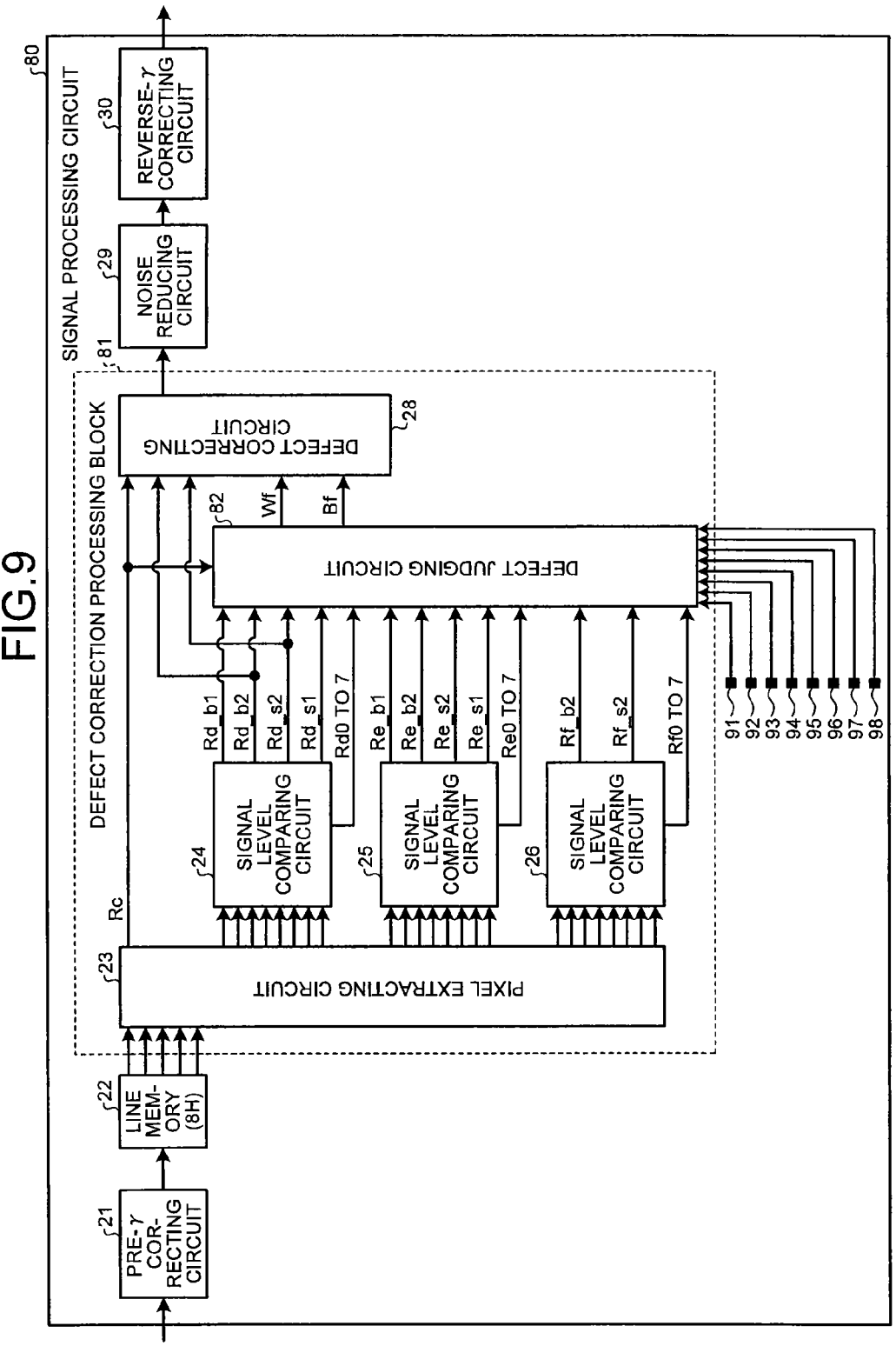

SOLID-STATE IMAGING DEVICE AND CAMERA MODULE

CROSS-REFERENCE TO RELATED APPLICATIONS

This application is based upon and claims the benefit of priority from Japanese Patent Application No. 2013-135373, filed on Jun. 27, 2013; the entire contents of all of which are incorporated herein by reference.

FIELD

Embodiments described herein relate generally to a solid-state imaging device and a camera module.

BACKGROUND

In recent years, in solid-state imaging devices, size reduction of pixels has been advanced along with the increase in number of pixels. Under such circumstances, the generation of a portion lacking a digital image signal due to a pixel not functioning normally (the portion is hereinafter referred to as "defect") in a solid-state imaging device has been viewed as a problem. A product with pixel defects more than defined in the inspection standard in a fault inspection in the manufacture of solid-state imaging devices is treated as a defective product. As this standard is stricter, the yield of solid-state imaging devices is deteriorated and the manufacturing cost is increased. In view of this, in the conventional solid-state imaging device, a method of making the defect less visible by signal processing in a defect correcting circuit has been positively employed.

The defect correcting circuit judges whether a target pixel, which is the target of the defect correction, is the defect or not by comparing a signal of the target pixel and signals of peripheral pixels around the target pixel. For judging whether the target pixel is the defect or not, for example, a defect correcting circuit using a signal of a peripheral pixel located on a line including the target pixel and a signal of a peripheral pixel located on a line before or after the line has been known. The peripheral pixel is, for example, a pixel for the same color as the target pixel.

For example, in the case where a picture component present in a subject is formed across the target pixel and the peripheral pixel, for example at the outline of an object or the boarder where the luminance changes, the defect may be misjudged depending on the position or the range of the picture component. As the accuracy of the defect judgment is easily decreased due to the presence of the picture component, the deterioration in image quality due to the erroneous defect correction becomes problematic.

BRIEF DESCRIPTION OF THE DRAWINGS

FIG. 5 is a diagram depicting an example of a pixel block;

FIG. 6 is a diagram depicting a target pixel and peripheral pixels within the pixel block of FIG. 5;

FIG. 9 is a block diagram depicting a signal processing circuit included in a solid-state imaging device according to a fourth embodiment.

DETAILED DESCRIPTION

In general, according to one embodiment, a solid-state imaging device includes a pixel extracting circuit, a signal level comparing circuit, a defect judging circuit, and a defect correcting circuit. The pixel extracting circuit extracts a signal of a target pixel and signals of peripheral pixels from a pixel block with the target pixel as the center. The peripheral pixels are pixels for the same color as the target pixel. The signal level comparing circuit compares the levels among the signals of the peripheral pixels extracted by the pixel extracting circuit. The signal level comparing circuit outputs the signals of the peripheral pixels rearranged in the order of the signal level. The defect judging circuit performs the defect judgment on the target pixel in response to the signal of the target pixel and the signals of the peripheral pixels from the signal level comparing circuit. The defect correcting circuit performs the defect correction on the target pixel in accordance with the result of the defect judgment in the defect judging circuit. The pixel extracting circuit extracts each signal of first peripheral pixels, second peripheral pixels, and third peripheral pixels. The first peripheral pixels are peripheral pixels arranged with pixels for colors other than the color of the target pixel interposed between the first peripheral pixels and the target pixel. The second peripheral pixels are peripheral pixels on extension lines in directions from the target pixel to the first peripheral pixels. The third peripheral pixels are peripheral pixels located between the second peripheral pixels. The signal level comparing circuit compares the levels among the signals of the first peripheral pixels, the levels among the signals of the second peripheral pixels, and the levels among the signals of the third peripheral pixels.

Exemplary embodiments of a solid-state imaging device and a camera module will be explained below in detail with reference to the accompanying drawings. The present invention is not limited to the following embodiments.

Figure 1:
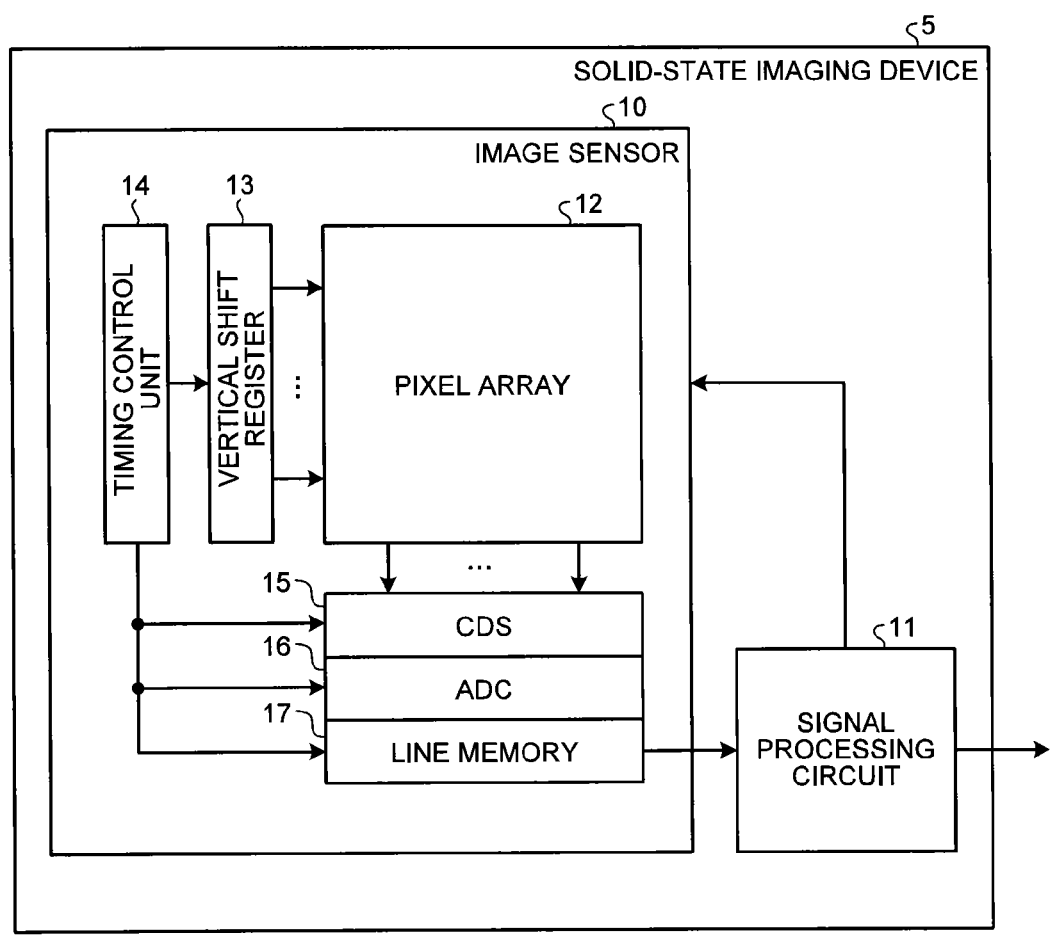
FIG. 1 is a block diagram depicting a schematic structure of a solid-state imaging device according to a first embodiment.
Figure 2:
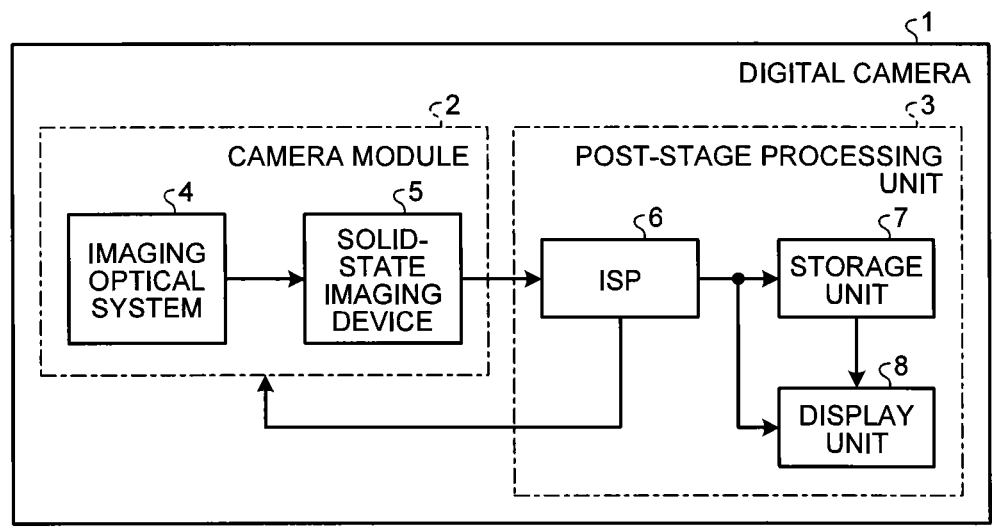
FIG. 2 is a block diagram depicting a schematic structure of a digital camera including the solid-state imaging device of FIG. 1.

FIG. 1 is a block diagram depicting a schematic structure of a solid-state imaging device according to a first embodiment. FIG. 2 is a block diagram depicting a schematic structure of a digital camera included in the solid-state imaging device of FIG. 1.

The digital camera 1 includes a camera module 2 and a post-stage processing unit 3. The camera module 2 includes an imaging optical system 4 and a solid-state imaging device 5. The post-stage processing unit 3 includes an image signal processor (ISP) 6, a storage unit 7, and a display unit 8. The camera module 2 is applicable to, other than the digital camera 1, an electronic appliance such as a mobile terminal equipped with a camera, for example.

The imaging optical system 4 takes in the light from a subject and forms a subject image. The solid-state imaging device 5 captures the subject image. The ISP 6 performs the signal processing of the image signal obtained by the capturing of the solid-state imaging device 5. The storage unit 7 stores the image after the signal processing in the ISP 6. In response to the user operation, for example, the storage unit 7 outputs the image signal to the display unit 8. The display unit 8 displays the image in response to the image signal input from the ISP 6 or the storage unit 7. The display unit 8 is, for example, a liquid crystal display. The digital camera 1 performs feedback control of the camera module 2 on the basis of the data after the signal processing in the ISP 6.

The solid-state imaging device 5 includes an image sensor 10 as an imaging element and a signal processing circuit 11 as an image processing device. The image sensor 10 is, for example, a CMOS image sensor. Other than the CMOS image sensor, the image sensor 10 may be a CCD.

The image sensor 10 includes a pixel array 12, a vertical shift register 13, a timing controlling unit 14, a correction double sampling unit (CDS) 15, an analog-digital converting unit (ADC) 16, and a line memory 17.

The pixel array 12 is provided for an imaging region of the image sensor 10. The pixel array 12 includes a plurality of pixels arranged in array in a horizontal direction (row direction) and a vertical direction (column direction). Each pixel includes a photodiode as a photoelectric converting element. The pixel array 12 generates a signal charge according to the amount of incident light entering each pixel.

The timing controlling unit 14 supplies a vertical synchronizing signal to the vertical shift register 13. The vertical synchronizing signal is a signal that orders the timing of reading out a signal from each pixel of the pixel array 12. The timing controlling unit 14 supplies a timing signal that orders a driving timing to the CDS 15, the ADC 16, and the line memory 17.

The vertical shift register 13 selects the pixels in the pixel array 12 for each row in response to the vertical synchronizing signal from the timing controlling unit 14. The vertical shift register 13 outputs a readout signal to each pixel in the selected row. The pixel having received the readout signal from the vertical shift register 13 outputs the signal charges accumulated according to the amount of incident light. The pixel array 12 outputs the signals from the pixels to the CDS 15 via a vertical signal line.

The CDS 15 performs the correlation double sampling process for reducing the fixed pattern noise on the signals from the pixel array 12. The ADC 16 converts the signal from an analog format into a digital format. The line memory 17 accumulates the signals from the ADC 16. The image sensor 10 outputs the signals accumulated in the line memory 17.

The signal processing circuit 11 performs various signal processing on the image signals from the image sensor 10. The signal processing circuit 11 performs signal processing such as defect correction, gamma correction, noise reduction, lens shading correction, and white balance adjustment. The solid-state imaging device 5 outputs the image signals after the signal processing in the signal processing circuit 11 out of the chip.

Figure 3:
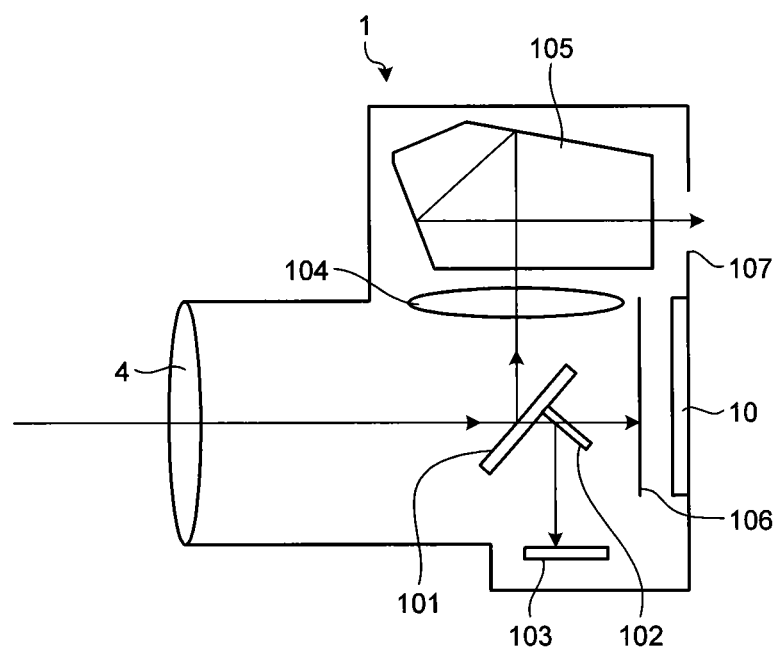
FIG. 3 is a diagram depicting a schematic structure of an optical system provided in the digital camera.

FIG. 3 is a diagram depicting a schematic structure of an optical system provided in the digital camera. The light having entered the imaging optical system 4 of the digital camera 1 from the subject travels to the image sensor 10 through a main mirror 101, a submirror 102, and a mechanical shutter 106. The digital camera 1 photographs the image of the subject in the image sensor 10.

The light reflected on the submirror 102 travels to an autofocusing (AF) sensor 103. The digital camera 1 performs the focusing adjustment in which the detection results from the AF sensor 103 are used. The light reflected on the main mirror 101 travels to a finder 107 through a lens 104 and a prism 105.

Figure 4:
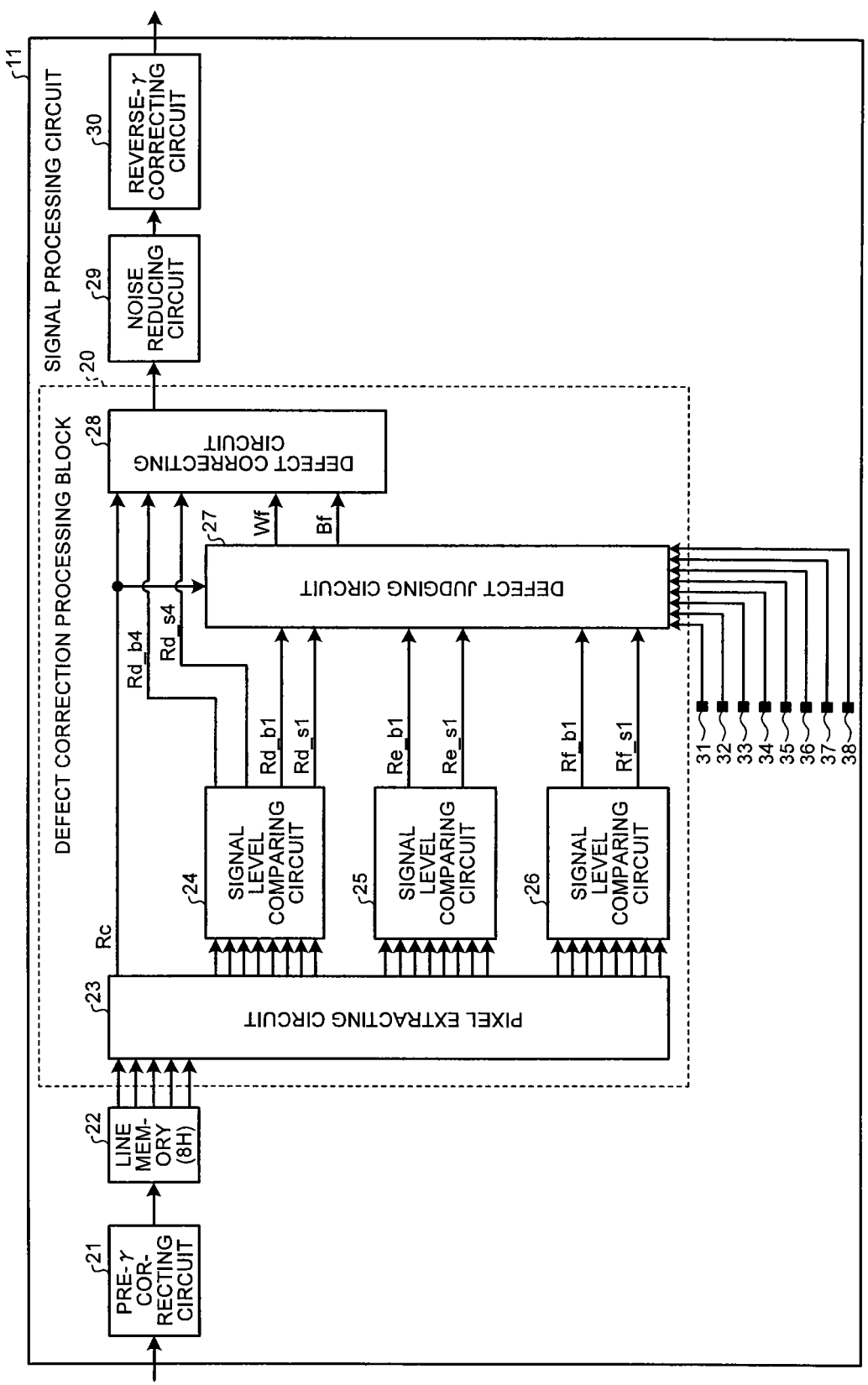
FIG. 4 is a block diagram depicting a structure of a signal processing circuit.

FIG. 4 is a block diagram depicting a structure of the signal processing circuit. Here, structures of the signal processing circuit 11 operating for the defect correction, the gamma correction, and the noise reduction are described respectively, and structures for the other processing are omitted.

The signal processing circuit 11 includes a defect correction processing block 20, a pre-γ (gamma) correcting circuit 21, a line memory (8H) 22, a noise reducing circuit 29, and a reverse-γ (gamma) correcting circuit 30. The defect correction processing block 20 includes a pixel extracting circuit 23, signal level comparing circuits 24, 25, and 26, a defect judging circuit 27, and a defect correcting circuit 28.

The pre-γ (gamma) correcting circuit 21 performs the γ-correction process of a signal before the defect correction is performed. The line memory 22 holds the signal from the pre-γ (gamma) correcting circuit 21. The line memory 22 sequentially delays signals for each line including the pixels arranged in the horizontal direction in the pixel array 12, and holds the signals for eight lines. The line memory 22 outputs the signals for the eight lines that are delayed sequentially and the signals for one line before being delayed.

The pixel extracting circuit 23 extracts the signal of the target pixel and the signals of the peripheral pixels out of the signals for the nine lines from the line memory 22. The target pixel is the pixel of the target of the defect correction in the defect correcting circuit 28. The peripheral pixels are the pixels for the same color as the target pixel, and are the pixels included in the pixel block with the target pixel as a center.

FIG. 5 is a diagram illustrating an example of the pixel block. FIG. 6 is a diagram illustrating the target pixel and the peripheral pixels among the pixel block of FIG. 5. Here, an R pixel is the pixel where the red component is detected. A B pixel is the pixel where the blue component is detected. A Gr pixel is the pixel where the green component is detected. The Gr pixel is adjacent to the R pixel in the horizontal direction. A Gb pixel is the pixel where the green component is detected. The Gb pixel is adjacent to the B pixels in the horizontal direction. The R, B, Gr, and Gb pixels constitute a Bayer array.

The pixel extracting circuit 23 extracts the signal of the target pixel and the signals of the peripheral pixels included in a 9×9 pixel block from the nine-line signals. The pixel extracting circuit 23 extracts, when the center of the pixel block is the R pixel, the signal of the target pixel (Rc) as the R pixel in the center and each signal of the peripheral pixels (Rd0 to 7, Rf0 to 7, and Re0 to 7) as the R pixels included in the pixel block.

The first peripheral pixels are peripheral pixels arranged with pixels other than the pixels with the same color as the target pixel interposed between the first peripheral pixels and the target pixel. The first peripheral pixels Rd0 to 7 are each disposed in a manner that any one of the pixels other than the R pixel, that is, the Gr pixel, the Gb pixel and the B pixel is interposed between the first peripheral pixel and the target pixel Rc. For example, in FIG. 6, the first peripheral pixel Rd1 is disposed vertically below the Rc with the Gb pixel interposed between the Rd1 and the Rc. The Rd0 to 7 are positioned at eight directions including vertical, horizontal, and oblique directions relative to the Rc.

The second peripheral pixels are peripheral pixels arranged on extension lines in the directions from the target pixel to the first peripheral pixels. The second peripheral pixels Rf0 to 7 are positioned on extension lines in the directions from the target pixel Rc to the first peripheral pixels Rd0 to 7. For example, in FIG. 6, the second peripheral pixel Rf1 is disposed vertically below the Rd1 with the Gb pixel interposed between the Rf1 and the Rd1. The Rf1 is positioned on an extension line in the vertical direction from the Rc to the Rd1. The Rf0 to 7 are positioned in eight directions including vertical, horizontal, and oblique directions relative to the Rc.

The third peripheral pixels are peripheral pixels arranged between the second peripheral pixels. The third peripheral pixels Re0 to 7 are positioned between the second peripheral pixels Rf0 to 7. For example, the third peripheral pixel Re0 is positioned between the Rf0 and Rf1. The Re0 to 7 are positioned in intermediate directions between the vertical, horizontal, and oblique directions relative to the Rc. For example, in FIG. 6, the Re0 is positioned in an intermediate direction between the vertically downward direction and the obliquely lower right direction from the Rc.

The pixel extracting circuit 23 synchronizes the timings of the signal of the target pixel and the signal of the peripheral pixel among the signals for the nine lines by using a shift register (not shown). Note that even when the target pixel is the B pixel, the Gr pixel, or the Gb pixel, the pixel extracting circuit 23 extracts the signals of the target pixel and the peripheral pixels in a manner similar to the case where the target pixel is the R pixel.

The pixel extracting circuit 23 outputs the signal of the target pixel to the defect judging circuit 27 and the defect correcting circuit 28. The pixel extracting circuit 23 outputs each signal of the first peripheral pixels to the signal level comparing circuit 24. The pixel extracting circuit 23 outputs each signal of the second peripheral pixels to the signal level comparing circuit 26. The pixel extracting circuit 23 outputs each signal of the third peripheral pixels to the signal level comparing circuit 25.

The signal level comparing circuits 24, 25, and 26 compare the levels among the signals of the peripheral pixels extracted by the pixel extracting circuit 23. The signal level comparing circuits 24, 25, and 26 output the signals of the peripheral pixels that have been rearranged in accordance with the order of the signal levels.

The signal level comparing circuit (first signal level comparing circuit) 24 compares the levels among the signals of the first peripheral pixels. The signal level comparing circuit 24 outputs the signals of the first peripheral pixels that have been rearranged in accordance with the order of the signal levels, to the defect judging circuit 27 and the defect correcting circuit 28.

The signal level comparing circuit (second signal level comparing circuit) 26 compares the levels among the signals of the second peripheral pixels. The signal level comparing circuit 26 outputs the signals of the second peripheral pixels that have been rearranged in accordance with the order of the signal levels, to the defect judging circuit 27.

The signal level comparing circuit (third signal level comparing circuit) 25 compares the levels among the signals of the third peripheral pixels. The signal level comparing circuit 25 outputs the signals of the third peripheral pixels that have been rearranged in accordance with the order of the signal levels, to the defect judging circuit 27.

The defect judging circuit 27 judges the defect on the target pixel in response to the signal of the target pixel from the pixel extracting circuit 23 and the signals of the peripheral pixels from the signal level comparing circuits 24, 25, and 26. The defect judging circuit 27 outputs a white defect flag (Wf) and a black defect flag (Bf) in accordance with the results of the defect judgment.

The white defect flag is the flag representing the results of the defect judgment that the target pixel is a white defect. The white defect is the defect indicating a higher signal level than when the pixel functions normally. The black defect flag is the flag representing the results of the defect judgment that the target pixel is a black defect. The black defect is the defect indicating a lower signal level than when the pixel functions normally.

The defect correcting circuit 28 performs the defect correction of the target pixel in accordance with the result of the defect judgment in the defect judging circuit 27. The defect correcting circuit 28 corrects the white defect of the target pixel upon the reception of the input of the white defect flag from the defect judging circuit 27. The defect correcting circuit 28 corrects the black defect of the target pixel upon the reception of the input of the black defect flag from the defect judging circuit 27.

The noise reducing circuit 29 reduces the noise from the signal from the defect correction processing block 20. The noise reducing circuit 29 performs the random noise reduction by the two-dimensional median filtering, for example, as the noise reducing process.

The reverse-γ correcting circuit 30 performs the reverse-γ process of the signal from the noise reducing circuit 29. The signal processing circuit 11 outputs the signal that has been subjected to the reverse-γ process in the reverse-γ correcting circuit 30. Note that the pre-γ correcting circuit 21 performs both the extension of the black level and the compression of the white level through the γ correction process. Through such γ correction process, the pre-γ correcting circuit 21 supplies the signal input to the signal processing circuit 11 to the defect correction processing block 20 as the state where the black defect is easily found. The reverse-γ correcting circuit 30 performs the reverse-γ correction process on the signal from the defect correction processing block 20, thereby cancelling the extension of the black level and the compression of the white level that have been performed by the γ correction process.

For example, if the target pixel is the R pixel, the pixel extracting circuit 23 outputs the signal (Rc) of the target pixel Rc to the defect judging circuit 27 and the defect correcting circuit 28. The signal level comparing circuit 24 compares the levels among the signals of the first peripheral pixels Rd0 to 7. The signal level comparing circuit 24 rearranges the eight signals in the order of the higher level.

The signal level comparing circuit 24 outputs the first signal (Rd_b1) after the rearrangement to the defect judging circuit 27. The Rd_b1 is the signal of the first peripheral pixel with the highest signal level among the Rd0 to 7. The signal level comparing circuit 24 outputs the eighth signal (Rd_s1) after the rearrangement to the defect judging circuit 27. The Rd_s1 is the signal of the first peripheral pixel with the lowest signal level among the Rd0 to 7. The signal level comparing circuit 24 outputs, for example, the fourth signal (Rd_b4) and the fifth signal (Rd_s4) after the rearrangement to the defect correcting circuit 28 as the signals for replacement in the defect correction.

The signal level comparing circuit 25 compares the levels among the signals of the third peripheral pixels Re0 to 7. The signal level comparing circuit 25 rearranges the eight signals in the order of the higher signal level. The signal level comparing circuit 25 outputs the first signal (Re_b1) after the rearrangement to the defect judging circuit 27. The Re_b1 is the signal of the third peripheral pixel with the highest signal level among the Re0 to 7. The signal level comparing circuit 25 outputs the eighth signal (Re_s1) after the rearrangement to the defect judging circuit 27. The Re_s1 is the signal of the third peripheral pixel with the lowest signal level among the Re0 to 7.

The signal level comparing circuit 26 compares the levels among the signals of the second peripheral pixels Rf0 to 7. The signal level comparing circuit 26 rearranges the eight signals in the order of the higher signal level. The signal level comparing circuit 26 outputs the first signal (Rf_b1) after the rearrangement to the defect judging circuit 27. The Rf_b1 is the signal of the second peripheral pixel with the highest signal level among the Rf0 to 7. The signal level comparing circuit 26 outputs the eighth signal (Rf_s1) after the rearrangement to the defect judging circuit 27. The Rf_s1 is the signal of the second peripheral pixel with the lowest signal level among the Rf0 to 7.

When all of the following formulae (1) to (5) are satisfied, the defect judging circuit 27 judges that the target pixel is the white defect. If the target pixel is judged as the white defect, the defect judging circuit 27 asserts the white defect flag (Wf).

$$Rc > Re\_b1 + Rslv31 \quad (1)$$

$$Rc > Rf\_b1 + Rslv32 \quad (2)$$

$$Rc > Rd\_b1 + Rslv33 \quad (3)$$

$$Rd\_b1 - Rd\_s1 < EVslv37 \quad (4)$$

$$Re\_b1 - Re\_s1 < EVslv38 \quad (5)$$

Here, Rslv31, Rslv32, Rslv33, EVslv37, and EVslv38 are the judgment slice levels. As a parameter for each judgment slice level, any value can be set. The signal processing circuit 11 holds the preset Rslv31, Rslv32, Rslv33, EVslv37, and EVslv38.

In the formulae (1) to (3), the condition of the white defect judgment is that the signal level of the target pixel is greater than the level obtained by adding the judgment slice level to the highest signal level in each of the first, second, and third peripheral pixels.

In the formula (4), the condition of the white defect judgment is that the contrast in the first peripheral pixels is less than the judgment slice level. Even though the formulae (1) to (3) are satisfied, the defect judging circuit 27 determines that there is the picture component in the target pixel unless the formula (4) is satisfied.

In the formula (5), the condition of the white defect judgment is that the contrast in the third peripheral pixels is less than the judgment slice level. Even though the formulae (1) to (3) are satisfied, the defect judging circuit 27 determines that there is the picture component in the target pixel unless the formula (5) is satisfied.

In the case where the white defect flag (Wf) is asserted from the defect judging circuit 27, the defect correcting circuit 28 replaces the value of the signal (Rc) of the target pixel with the value of Rd_b4 from the signal level comparing circuit 24. Note that the defect correcting circuit 28 may replace the value of the signal of the target pixel judged as the white defect with the value of the signal other than the Rd_b4.

In the case where all of the following formulae (6) to (10) are satisfied, the defect judging circuit 27 determines that the target pixel is the black defect. Upon the judgment of the target pixel as the black defect, the defect judging circuit 27 asserts the black defect flag (Bf).

$$Rc < Re\_s1 - Rslv34 \quad (6)$$

$$Rc < Rf\_s1 - Rslv35 \quad (7)$$

$$Rc < Rd\_s1 - Rslv36 \quad (8)$$

$$Rd\_b1 - Rd\_s1 < EVslv37 \quad (9)$$

$$Re\_b1 - Re\_s1 < EVslv38 \quad (10)$$

Here, Rslv34, Rslv35, and Rslv36 are the judgment slice levels. As a parameter of each judgment slice level, any value is set. The signal processing circuit 11 holds the preset Rslv34, Rslv35, and Rslv36. The formula (9) employs EVslv37, which is common to the formula (4). The formula (10) employs EVslv38, which is common to the formula (5).

In the formulae (6) to (8), the condition of the black defect judgment is that the signal level of the target pixel is less than the level obtained by subtracting the judgment slice level from the lowest signal level in each of the first, second, and third peripheral pixels.

In the formula (9), the condition of the black defect judgment is that the contrast in the first peripheral pixels is less than the judgment slice level. Even though the formulae (6) to (8) are satisfied, the defect judging circuit 27 determines that there is the picture component in the target pixel unless the formula (9) is satisfied.

In the formula (10), the condition of the black defect judgment is that the contrast in the third peripheral pixels is less than the judgment slice level. Even though the formulae (6) to (8) are satisfied, the defect judging circuit 27 determines that there is the picture component in the target pixel unless the formula (10) is satisfied.

In the case where the black defect flag (Bf) is asserted from the defect judging circuit 27, the defect correcting circuit 28 replaces the value of the signal (Rc) of the target pixel with the value of Rd_s4 from the signal level comparing circuit 24. Note that the defect correcting circuit 28 may replace the value of the signal of the target pixel judged as the black defect with the signal other than the Rd_s4.

In the case where neither the white defect flag (Wf) nor the black defect flag (Bf) is asserted from the defect judging circuit 27, the defect correcting circuit 28 does not perform the defect correction and lets the signal (Rc) of the target pixel pass.

In the first embodiment, the signal processing circuit 11 confirms in the defect judging circuit 27 that the target pixel is not included in the picture component in the eight directions including the vertical, horizontal, and oblique directions on the basis of the above formulae (4) and (9). Moreover, the signal processing circuit 11 confirms in the defect judging circuit 27 that the target pixel is not included in the picture component in the intermediate directions between the vertical, horizontal, and oblique directions on the basis of the above formulae (5) and (10).

The signal processing circuit 11 performs the defect correction in the case where the picture component is not detected not just in the eight directions to the first peripheral pixels, each of which is one pixel apart from the target pixel, but also the eight intermediate directions thereof. The signal processing circuit 11 can perform the highly accurate defect judgment on any subject image where various picture components can exist. The highly accurate defect judgment can be performed by referring to not just the first peripheral pixels at positions one pixel apart from the target pixel but also the second peripheral pixels and the third peripheral pixels in the defect judgment. The signal processing circuit 11 can perform the accurate defect correction because the highly accurate defect judgment is possible. Thus, the solid-state imaging device 5 provides the effect that the high-quality image can be obtained by the accurate defect correction.

Note that the defect correction in the first embodiment is performed on the premise that the number of pixels as the defect is one or less within the pixel block. If the target pixel is the defect, in the case where none of the first, second, and third peripheral pixels is the defect, the signal processing circuit 11 can perform the effective defect correction on the target pixel.

Figure 7:
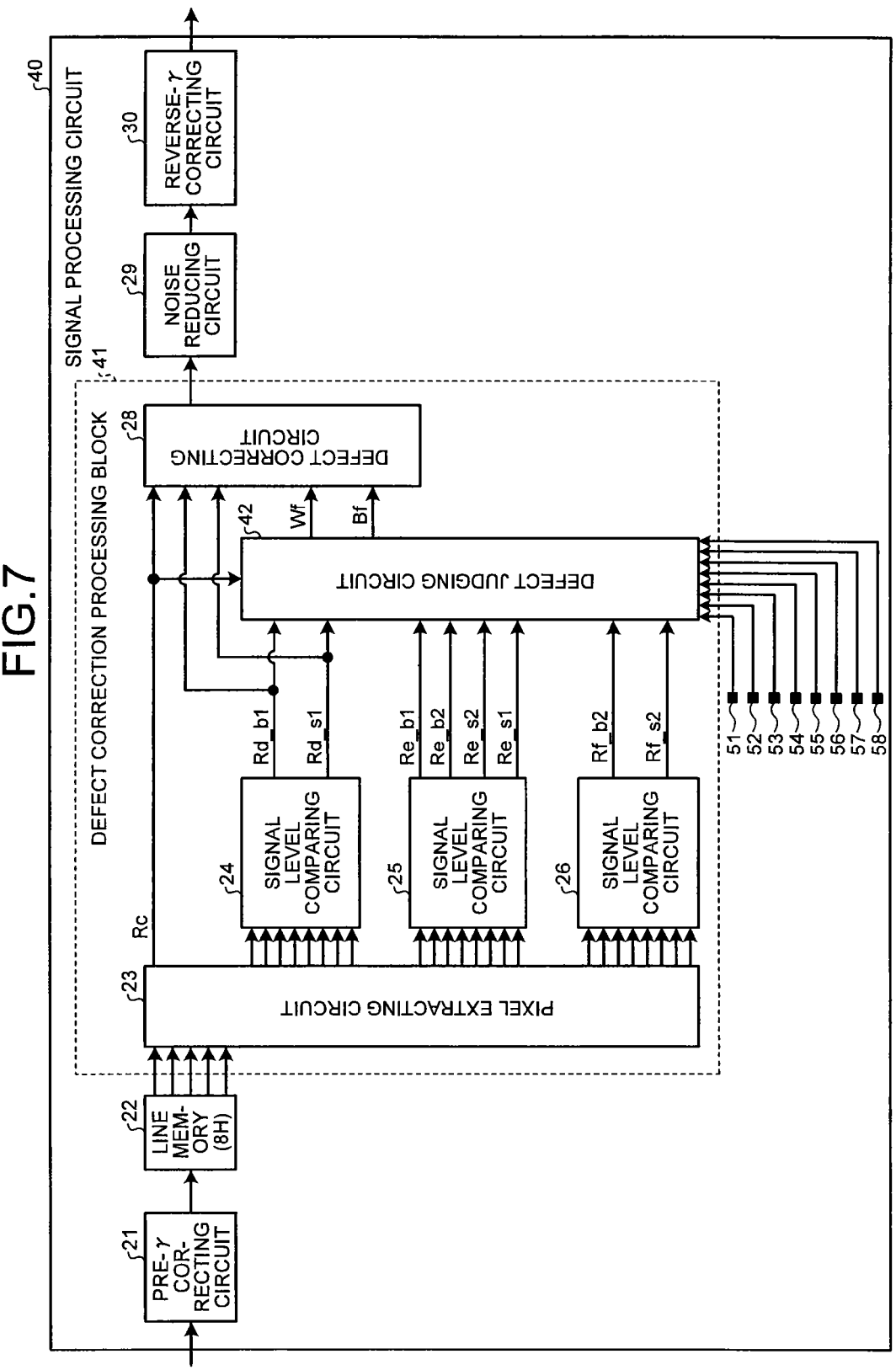
FIG. 7 is a block diagram depicting a signal processing circuit included in a solid-state imaging device according to a second embodiment.

FIG. 7 is a block diagram depicting the structure of the signal processing circuit included in a solid-state imaging device according to a second embodiment. A signal processing circuit 40 according to this embodiment is provided instead of the signal processing circuit 11 in the solid-state imaging device 5 according to the first embodiment. The same part as that of the first embodiment is denoted by the same reference symbol, and the description is omitted as appropriate. Here, structures of the signal processing circuit 40 used for the defect correction, the gamma correction, and the noise reduction are described respectively, and structures for the other processing are omitted.

A defect correction processing block 41 includes the pixel extracting circuit 23, the signal level comparing circuits 24, 25, and 26, a defect judging circuit 42, and the defect correcting circuit 28. The defect judging circuit 42 judges the defect on the target pixel in response to the signal of the target pixel from the pixel extracting circuit 23, and the signals of the peripheral pixels from the signal level comparing circuits 24, 25, and 26.

For example, in the case where the target pixel is the R pixel as depicted in FIG. 5, the pixel extracting circuit 23 outputs the signal (Rc) of the Rc as the target pixel to the defect judging circuit 42 and the defect correcting circuit 28. The signal level comparing circuit 24 compares the levels among the signals of the first peripheral pixels Rd0 to 7. The signal level comparing circuit 24 rearranges the eight signals in the order of higher level.

The signal level comparing circuit 24 outputs the first signal (Rd_b1) and the eighth signal (Rd_s1) after the rearrangement to the defect judging circuit 42. Furthermore, the signal level comparing circuit 24 outputs, for example, the Rd_b1 and Rd_s1 as the signals for replacement in the defect correction to the defect correcting circuit 28.

The signal level comparing circuit 25 compares the levels among the signals of the third peripheral pixels Re0 to 7. The signal level comparing circuit 25 rearranges the eight signals in the order of higher level. The signal level comparing circuit 25 outputs the first signal (Re_b1), the second signal (Re_b2), the seventh signal (Re_s2), and the eighth signal (Re_s1) after the rearrangement to the defect judging circuit 42. The Re_b2 is the signal of the third peripheral pixel with the second highest level, which is one lower than the highest signal level, among the Re0 to 7. The Re_s2 is the signal of the third peripheral pixel with the second lowest level, which is one higher than the lowest signal level, among the Re0 to 7.

The signal level comparing circuit 26 compares the levels among the signals of the second peripheral pixels Rf0 to 7. The signal level comparing circuit 26 rearranges the eight signals in the order of higher level. The signal level comparing circuit 26 outputs the second signal (Rf_b2) and the seventh signal (Rf_s2) after the rearrangement to the defect judging circuit 42. The Rf_b2 is the signal of the second peripheral pixel with the second highest level, which is one lower than the highest signal level, among the Rf0 to 7. The Rf_s2 is the signal of the second peripheral pixel with the second lowest level, which is one higher than the lowest signal level, among the Rf0 to 7.

In the case where all of the following formulae (11) to (15) are satisfied, the defect judging circuit 42 determines that the target pixel is the white defect. Upon the judgment of the target pixel as the white defect, the defect judging circuit 42 asserts the white defect flag (Wf).

$$Rc > Rd\_b1 + Rslv51 \qquad (11)$$

$$Rc > Re\_b2 + Rslv52 \qquad (12)$$

$$Rc > Rf\_b2 + Rslv53 \qquad (13)$$

$$Rd\_b1 - Rd\_s1 < EVslv57 \qquad (14)$$

$$Re\_b1 - Re\_s1 < EVslv58 \qquad (15)$$

Here, the Rslv51, Rslv52, Rslv53, EVslv57, and EVslv58 are the judgment slice levels. As a parameter of each judgment slice level, any value is set. The signal processing circuit 40 holds the preset Rslv51, Rslv52, Rslv53, EVslv57, and EVslv58.

In the formula (12), the condition of the white defect judgment is that the signal level of the target pixel is higher than the level obtained by adding the judgment slice level to the second highest signal level in the third peripheral pixels. In the formula (13), the condition of the white defect judgment is that the signal level of the target pixel is higher than the level obtained by adding the judgment slice level to the second highest signal level in the second peripheral pixels.

In the case where the white defect flag (Wf) is asserted from the defect judging circuit 42, the defect correcting circuit 28 replaces the value of the signal (Rc) of the target pixel with the value of Rd_b1 from the signal level comparing circuit 24. Note that the defect correcting circuit 28 may replace the value of the signal of the target pixel judged as the white defect with the signal other than the Rd_b1. For example, the defect correcting circuit 28 may replace the value of the signal of the target pixel with the value of the Rd_b4 in a manner similar to the first embodiment.

In the case where all of the following formulae (16) to (20) are satisfied, the defect judging circuit 42 determines that the target pixel is the black defect. Upon the judgment of the target pixel as the black defect, the defect judging circuit 42 asserts the black defect flag (Bf).

$$Rc < Rd\_s1 - Rslv54 \qquad (16)$$

$$Rc < Re\_s2 - Rslv55 \qquad (17)$$

$$Rc < Rf\_s2 - Rslv56 \qquad (18)$$

$$Rd\_b1 - Rd\_s1 < EVslv57 \qquad (19)$$

$$Re\_b1 - Re\_s1 < EVslv58 \qquad (20)$$

Here, Rslv54, Rslv55, and Rslv56 are the judgment slice level. As a parameter for each judgment slice level, any value can be set. The signal processing circuit 40 holds the preset Rslv54, Rslv55, and Rslv56. The formula (19) employs EVslv57, which is common to the formula (14). The formula (20) employs EVslv58, which is common to the formula (15).

In the formula (17), the condition of the black defect judgment is that the signal level of the target pixel is lower than the level obtained by subtracting the judgment slice level from the second lowest signal level in the third peripheral pixels. In the formula (18), the condition of the black defect judgment is that the signal level of the target pixel is lower than the level obtained by subtracting the judgment slice level from the second lowest signal level in the second peripheral pixels.

In the case where the black defect flag (Bf) is asserted from the defect judging circuit 42, the defect correcting circuit 28 replaces the value of the signal (Rc) of the target pixel with the value of Rd_s1 from the signal level comparing circuit 24. Note that the defect correcting circuit 28 may replace the value of the signal of the target pixel judged as the black defect with the signal other than the Rd_s1. For example, the defect correcting circuit 28 may replace the value of the signal of the target pixel with the value of the Rd_s4 in a manner similar to the first embodiment.

In the case where neither the white defect flag (Wf) nor the black defect flag (Bf) is asserted from the defect judging circuit 42, the defect correcting circuit 28 does not perform the defect correction and lets the signal (Rc) of the target pixel pass.

In the second embodiment, the signal processing circuit 40 can perform the accurate defect correction by enabling the highly accurate defect judgment on any subject image where various picture components can exist. Thus, the solid-state imaging device 5 provides the effect that the high-quality image can be obtained through the accurate defect correction.

Note that the defect correction in the second embodiment is performed on the premise that the number of pixels as the defect is one or less among the second peripheral pixels and one or less among the third peripheral pixels, except the target pixel. If the target pixel is the defect, in the case where none of the first peripheral pixels is the defect and the number of defects is one or less in each of the second peripheral pixels and the third peripheral pixels, the signal processing circuit 40 can perform the effective defect correction on the target pixel.

According to the second embodiment, the signal processing circuit 40 can perform the defect correction even in the circumstances where not just the target pixel but also the second peripheral pixel and the third peripheral pixel are the defect. The signal processing circuit 40 can relieve the condition for the defect distribution as compared with the case where the number of pixels as the defect allowed in the pixel block is one in the premise of the defect correction. For example, by enabling to relieve the standard for the fault inspection during the manufacture, the yield of the solid-state imaging device 5 can be increased.

Figure 8:
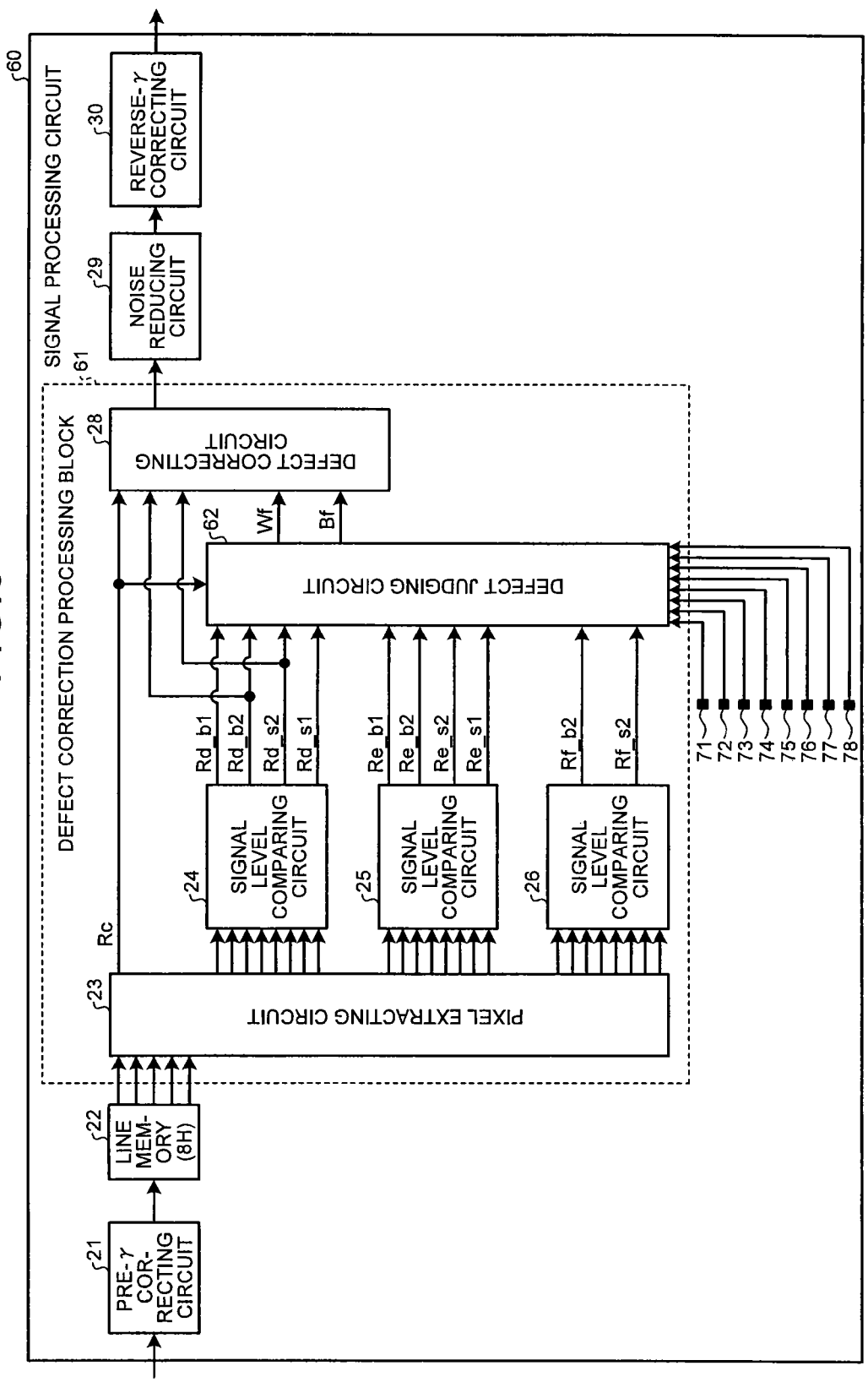
FIG. 8 is a block diagram depicting a signal processing circuit included in a solid-state imaging device according to a third embodiment.

FIG. 8 is a block diagram depicting a signal processing circuit included in a solid-state imaging device according to a third embodiment. A signal processing circuit 60 of this embodiment is provided instead of the signal processing circuit 11 in the solid-state imaging device 5 in the first embodiment. The same part as that in the first embodiment is denoted by the same reference symbol, and the description is omitted as appropriate. Here, structures of the signal processing circuit 60 used for the defect correction, the gamma correction, and the noise reduction are described respectively, and structures for the other processing are omitted.

A defect correction processing block 61 includes the pixel extracting circuit 23, the signal level comparing circuits 24, 25, and 26, a defect judging circuit 62, and the defect correcting circuit 28. The defect judging circuit 62 judges the defect pixel from the pixel extracting circuit 23, and the signals of the peripheral pixels from the signal level comparing circuits 24, 25, and 26.

For example, in the case where the target pixel is the R pixel as depicted in FIG. 5, the pixel extracting circuit 23 outputs the signal (Rc) of the Rc as the target pixel to the defect judging circuit 62 and the defect correcting circuit 28. The signal level comparing circuit 24 compares the levels among the signals of the first peripheral pixels Rd0 to 7. The signal level comparing circuit 24 rearranges the eight signals in the order of higher level.

The signal level comparing circuit 24 outputs the first signal (Rd_b1), the second signal (Rd_b2), the seventh signal (Rd_s2), and the eighth signal (Rd_s1) after the rearrangement to the defect judging circuit 62. The Rd_b2 is the signal of the first peripheral pixel with the second highest level, which is one lower than the highest signal level, among the Rd0 to 7. The Rd_s2 is the signal of the first peripheral pixel with the second lowest level, which is one higher than the lowest signal level, among the Rd0 to 7. Furthermore, the signal level comparing circuit 24 outputs, for example, the Rd_b2 and Rd_s2 as the signal for replacement in the defect correction to the defect correcting circuit 28.

The signal level comparing circuit 25 compares the levels among the signals of the third peripheral pixels Re0 to 7. The signal level comparing circuit 25 rearranges the eight signals in the order of higher level. The signal level comparing circuit 25 outputs the first signal (Re_b1), the second signal (Re_b2), the seventh signal (Re_s2), and the eighth signal (Re_s1) after the rearrangement to the defect judging circuit 62.

The signal level comparing circuit 26 compares the levels among the signals of the second peripheral pixels Rf0 to 7. The signal level comparing circuit 26 rearranges the eight signals in the order of higher level. The signal level comparing circuit 26 outputs the second signal (Rf_b2) and the seventh signal (Rf_s2) after the rearrangement to the defect judging circuit 62.

In the case where all of the following formulae (21) to (25) are satisfied, the defect judging circuit 62 determines that the target pixel is the white defect. Upon the judgment of the target pixel as the white defect, the defect judging circuit 62 asserts the white defect flag (Wf).

$$Rc > Re\_b2 + Rslv71 \quad (21)$$

$$Rc > Rf\_b2 + Rslv72 \quad (22)$$

$$Rc > Rd\_b2 + Rslv73 \quad (23)$$

$$Rd\_b1 - Rd\_s1 < EVslv77 \quad (24)$$

$$Re\_b1 - Re\_s1 < EVslv78 \quad (25)$$

Here, Rslv71, Rslv72, Rslv73, EVslv77, and EVslv78 are the judgment slice levels. As a parameter of each judgment slice level, any value is set. The signal processing circuit 60 holds the preset Rslv71, Rslv72, Rslv73, EVslv77, and EVslv78.

In the formula (23), the condition of the white defect judgment is that the signal level of the target pixel is higher than the level obtained by adding the judgment slice level to the second highest signal level in the first peripheral pixels.

In the case where the white defect flag (Wf) is asserted from the defect judging circuit 62, the defect correcting circuit 28 replaces the value of the signal (Rc) of the target pixel with the value of Rd_b2 from the signal level comparing circuit 24. Note that the defect correcting circuit 28 may replace the value of the signal of the target pixel judged as the white defect with the value of the signal other than the Rd_b2.

For example, the defect correcting circuit 28 may replace the value of the signal of the target pixel with the value of the Rd_b4 in a manner similar to the first embodiment. Note that since the pixel Rd_b1 is likely to be the white defect, the defect correcting circuit 28 uses the signal other than the Rd_b1 for the replacement of the target pixel in the third embodiment.

In the case where all of the following formulae (26) to (30) are satisfied, the defect judging circuit 62 determines that the target pixel is the black defect. Upon the judgment of the target pixel as the black defect, the defect judging circuit 62 asserts the black defect flag (Bf).

$$Rc < Re\_s2 - Rslv74 \quad (26)$$

$$Rc < Rf\_s2 - Rslv75 \quad (27)$$

$$Rc < Rd\_s2 - Rslv76 \quad (28)$$

$$Rd\_b1 - Rd\_s1 < EVslv77 \quad (29)$$

$$Re\_b1 - Re\_s1 < EVslv78 \quad (30)$$

Here, Rslv74, Rslv75, and Rslv76 are the judgment slice levels. As a parameter of each judgment slice level, any value is set. The signal processing circuit 60 holds the preset Rslv74, Rslv75, and Rslv76. The formula (29) employs EVslv77, which is common to the formula (24). The formula (30) employs EVslv78, which is common to the formula (25).

In the formula (28), the condition of the black defect judgment is that the signal level of the target pixel is less than the level obtained by subtracting the judgment slice level from the second lowest signal level in the first peripheral pixels.

In the case where the black defect flag (bf) is asserted from the defect judging circuit 62, the defect correcting circuit 28 replaces the value of the signal (Rc) of the target pixel with the value of Rd_s2 from the signal level comparing circuit 24. Note that the defect correcting circuit 28 may replace the value of the signal of the target pixel judged as the black defect with the value of the signal other than the Rd_s2. For example, the defect correcting circuit 28 may replace the value of the signal of the target pixel with the value of the Rd_s4 in a manner similar to the first embodiment. Note that since the pixel Rd_s1 is likely to be the black defect, the defect correcting circuit 28 uses the signal other than the Rd_s1 for the replacement of the target pixel in the third embodiment.

In the case where neither the white defect flag (Wf) nor the black defect flag (Bf) is asserted from the defect judging circuit 62, the defect correcting circuit 28 does not perform the defect correction and lets the signal (Rc) of the target pixel pass.

In the third embodiment, the signal processing circuit 60 can perform the accurate defect correction by enabling the highly accurate defect judgment on any subject image where various picture components can exist. Thus, the solid-state imaging device 5 provides the effect that the high-quality image can be obtained through the accurate defect correction.

Note that the defect correction in the third embodiment is performed on the premise that the number of pixels as the defect is one or less among the first peripheral pixels, one or less among the second peripheral pixels, and one or less among the third peripheral pixels, except the target pixel. If the target pixel is the defect, in the case where the number of defects is one or less in each of the first peripheral pixels, the second peripheral pixels, and the third peripheral pixels, the signal processing circuit 60 can perform the effective defect correction on the target pixel.

According to the third embodiment, the signal processing circuit 60 can perform the defect correction even in the circumstances where not just the target pixel but also one of the first peripheral pixel, the second peripheral pixel, and the third peripheral pixel are the defect. The signal processing circuit 60 can relieve the condition for the defect distribution as compared with the case where the number of pixels as the defect allowed in the pixel block is one in the premise of the defect correction. For example, by enabling to relieve the standard for the fault inspection during the manufacture, the yield of the solid-state imaging device 5 can be increased.

FIG. 9 is a block diagram depicting a signal processing circuit included in a solid-state imaging device according to a fourth embodiment. A signal processing circuit 80 of this embodiment is provided instead of the signal processing circuit 11 in the solid-state imaging device 5 in the first embodiment. The same part as that in the first embodiment is denoted by the same reference symbol, and the description is omitted as appropriate. Here, structures of the signal processing circuit 80 used for the defect correction, the gamma correction, and the noise reduction are described respectively, and structures for the other processing are omitted.

A defect correction processing block 81 includes the pixel extracting circuit 23, the signal level comparing circuits 24, 25, and 26, a defect judging circuit 82, and the defect correcting circuit 28. The defect judging circuit 82 judges the defect on the target pixel in response to the signal of the target pixel from the pixel extracting circuit 23, and the signals of the peripheral pixels from the signal level comparing circuits 24, 25, and 26.

For example, in the case where the target pixel is the R pixel as depicted in FIG. 5, the pixel extracting circuit 23 outputs the signal (Rc) of the Rc as the target pixel to the defect judging circuit 82 and the defect correcting circuit 28. The signal level comparing circuit 24 compares the levels among the signals of the first peripheral pixels Rd0 to 7. The signal level comparing circuit 24 rearranges the eight signals in the order of higher level.

The signal level comparing circuit 24 outputs the first signal (Rd_b1), the second signal (Rd_b2), the seventh signal (Rd_s2), and the eighth signal (Rd_s1) after the rearrangement to the defect judging circuit 82. The signal level comparing circuit 24 outputs, for example, the Rd_b2 and Rd_s2 as the signals for replacement in the defect correction to the defect correcting circuit 28. Moreover, the signal level comparing circuit 24 outputs to the defect judging circuit 82, the each signals (Rd0 to 7) of the first peripheral pixels Rd0 to 7.

The signal level comparing circuit 25 compares the levels among the signals of the third peripheral pixels Re0 to 7. The signal level comparing circuit 25 rearranges the eight signals in the order of higher level. The signal level comparing circuit 25 outputs the first signal (Re_b1), the second signal (Re_b2), the seventh signal (Re_s2), and the eighth signal (Re_s1) after the rearrangement to the defect judging circuit 82. Moreover, the signal level comparing circuit 25 outputs to the defect judging circuit 82, the each signals (Re0 to 7) of the third peripheral pixels Re0 to 7.

The signal level comparing circuit 26 compares the levels among the signals of the second peripheral pixels Rf0 to 7. The signal level comparing circuit 26 rearranges the eight signals in the order of higher level. The signal level comparing circuit 26 outputs the second signal (Rf_b2) and the seventh signal (Rf_s2) after the rearrangement to the defect judging circuit 82. Moreover, the signal level comparing circuit 26 outputs to the defect judging circuit 82, the each signals (Rf0 to 7) of the second peripheral pixels Rf0 to 7.

The defect judging circuit 82 performs the white defect judgment on the basis of the following formulae (31) to (35).

$$Rc > Re\_b2 + Rslv91 \tag{31}$$

$$Rc > Rf\_b2 + Rslv92 \tag{32}$$

$$Rc > Rd\_b2 + Rslv93 \tag{33}$$

$$Rd\_b1 - Rd\_s1 < EVslv97 \tag{34}$$

$$Re\_b1 - Re\_s1 < EVslv98 \tag{35}$$

In the case where all of the above formulae (31) to (35) are satisfied and any of the following conditions (1-1) to (1-8) is satisfied, the defect judging circuit 82 determines that the target pixel is the white defect. Upon the judgment of the target pixel as the white defect, the defect judging circuit 82 asserts the white defect flag (Wf).

Condition (1-1): Rd0>Rd_b2+Rslv93 is satisfied, and any of Rc>Re0+Rslv91, Rc>Re2+Rslv91, Rc>Rf0+Rslv92, Rc>Rf1+Rslv92, and Rc>Rf3+Rslv92 is satisfied.

Condition (1-2): Rd1>Rd_b2+Rslv93 is satisfied, and any of Rc>Re0+Rslv91, Rc>Re1+Rslv91, and Rc>Rf1+Rslv92 is satisfied.

Condition (1-3): Rd2>Rd_b2+Rslv93 is satisfied, and any of Rc>Re1+Rslv91, Rc>Re3+Rslv91, Rc>Rf1+Rslv92, Rc>Rf2+Rslv92, and Rc>Rf4+Rslv92 is satisfied.

Condition (1-4): Rd3>Rd_b2+Rslv93 is satisfied, and any of Rc>Re2+Rslv91, Rc>Re4+Rslv91, and Rc>Rf3+Rslv92 is satisfied.

Condition (1-5): Rd4>Rd_b2+Rslv93 is satisfied, and any of Rc>Re3+Rslv91, Rc>Re5+Rslv91, and Rc>Rf4+Rslv92 is satisfied.

Condition (1-6): Rd5>Rd_b2+Rslv93 is satisfied, and any of Rc>Re4+Rslv91, Rc>Re6+Rslv91, Rc>Rf3+Rslv92, Rc>Rf5+Rslv92, and Rc>Rf6+Rslv92 is satisfied.

Condition (1-7): Rd6>Rd_b2+Rslv93 is satisfied, and any of Rc>Re6+Rslv91, Rc>Re7+Rslv91, and Rc>Rf6+Rslv92 is satisfied.

Condition (1-8): Rd7>Rd_b2+Rslv93 is satisfied, and any of Rc>Re5+Rslv91, Rc>Re7+Rslv91, Rc>Rf4+Rslv92, Rc>Rf6+Rslv92, and Rc>Rf7+Rslv92 is satisfied.

Here, Rslv91, Rslv92, Rslv93, EVslv97, and EVslv98 are the judgment slice levels. As a parameter of each judgment slice level, any value is set. The signal processing circuit 80 holds the preset Rslv91, Rslv92, Rslv93, EVslv97, and EVslv98.

In the conditions (1-1) to (1-8), when the signal of the first peripheral pixel with the highest level is greater than the sum of the signal of the first peripheral pixel with the second highest level and the parameter of the judgment slice level, the defect judging circuit 82 judges the first peripheral pixel with the highest level as the white defect. In this case, the defect judging circuit 82 performs the white defect judgment on the target pixel using the signals of the second peripheral pixel and the third peripheral pixel instead of the first peripheral pixel with the highest level.

The defect judging circuit 82 specifies the second peripheral pixel and the third peripheral pixel that are close to the first peripheral pixel with the highest level. The defect judging circuit 82 performs the white defect judgment in accordance with the result obtained by comparing the signal of the target pixel and each signal of the second peripheral pixel and the third peripheral pixel specified depending on the position of the first peripheral pixel with the highest level.

For example, according to the condition (1-1), when the first peripheral pixel Rd0 has the highest level and the signal thereof (Rd0) is greater than the sum of the signal (Rd_b2) with the second highest level and the judgment slice level (Rslv93), the defect judging circuit 82 specifies the second peripheral pixels Rf0, Rf1, and Rf3 and the third peripheral pixels Re0 and Re2 that are close to the Rd0.

The defect judging circuit 82 compares the level of the signal (Rc) of the target pixel and the level obtained by adding the judging slice level (Rslv92) to each signal (Rf0, Rf1, and Rf3) of the second peripheral pixels. The defect judging circuit 82 compares the level of the signal (Rc) of the target pixel and the level obtained by adding the judging slice level (Rslv91) to each signal (Re0 and Re2) of the third peripheral pixels. In any of these comparisons, if the signal (Rc) of the target pixel is greater, the defect judging circuit 82 judges the target pixel as the white defect.

Methods of the white defect judgment according to the conditions (1-2) to (1-8) are similar to the method of the white defect judgment according to the condition (1-1). In this manner, the defect judging circuit 82 performs the white defect judgment on the target pixel except the first peripheral pixel judged as the defect.

In the case where the white defect flag (Wf) is asserted from the defect judging circuit 82, the defect correcting circuit 28 replaces the value of the signal (Rc) of the target pixel with the value of Rd_b2 from the signal level comparing circuit 24. Note that the defect correcting circuit 28 may replace the value of the signal of the target pixel judged as the white defect with the value of the signal other than the Rd_b2.

For example, the defect correcting circuit 28 may replace the value of the signal of the target pixel with the value of the Rd_b4 in a manner similar to the first embodiment. Note that since the pixel Rd_b1 is likely to be the white defect, the defect correcting circuit 28 uses the signal other than the Rd_b1 for the replacement of the target pixel in the fourth embodiment.

The defect judging circuit 82 performs the black defect judgment on the basis of the following formulae (36) to (40).

$$Rc < Re\_s2 - Rslv94 \tag{36}$$

$$Rc < Rf\_s2 - Rslv95 \tag{37}$$

$$Rc < Rd\_s2 - Rslv96 \tag{38}$$

$$Rd\_b1 - Rd\_s1 < EVslv97 \tag{39}$$

$$Re\_b1 - Re\_s1 < EVslv98 \tag{40}$$

In the case where all of the above formulae (36) to (40) are satisfied and any of the following conditions (2-1) to (2-8) is satisfied, the defect judging circuit 82 judges the target pixel as the black defect. Upon the judgment of the target pixel as the black defect, the defect judging circuit 82 asserts the black defect flag (Bf).

Condition (2-1): Rd0<Rd_s2−Rslv96 is satisfied, and any of Rc<Re0−Rslv94, Rc<Re2−Rslv94, Rc<Rf0−Rslv95, Rc<Rf1−Rslv95, and Rc<Rf3−Rslv95 is satisfied.

Condition (2-2): Rd1<Rd_s2−Rslv96 is satisfied, and any of Rc<Re0−Rslv94, Rc<Re1−Rslv94, and Rc<Rf1−Rslv95 is satisfied.

Condition (2-3): Rd2<Rd_s2−Rslv96 is satisfied, and any of Rc<Re1−Rslv94, Rc<Re3−Rslv94, Rc<Rf1−Rslv95, Rc<Rf2−Rslv95, and Rc<Rf4−Rslv95 is satisfied.

Condition (2-4): Rd3<Rd_s2−Rslv96 is satisfied, and any of Rc<Re2−Rslv94, Rc<Re4−Rslv94, and Rc<Rf3−Rslv95 is satisfied.

Condition (2-5): Rd4<Rd_s2−Rslv96 is satisfied, and any of Rc<Re3−Rslv94, Rc<Re5−Rslv94, and Rc<Rf4−Rslv95 is satisfied.

Condition (2-6): Rd5<Rd_s2−Rslv96 is satisfied, and any of Rc<Re4−Rslv94, Rc<Re6−Rslv94, Rc<Rf3-Rslv95, Rc<Rf5−Rslv95, and Rc<Rf6−Rslv95 is satisfied.

Condition (2-7): Rd6<Rd_s2−Rslv96 is satisfied, and any of Rc<Re6−Rslv94, Rc<Re7−Rslv94, and Rc<Rf6−Rslv95 is satisfied.

Condition (2-8): Rd7<Rd_s2−Rslv96 is satisfied, and any of Rc<Re5−Rslv94, Rc<Re7−Rslv94, Rc<Rf4 Rslv95, Rc<Rf6−Rslv95, and Rc<Rf7−Rslv95 is satisfied.

Here, Rslv94, Rslv95, and Rslv96 are the judgment slice levels. As a parameter of each judgment slice level, any value is set. The signal processing circuit 80 holds the preset Rslv94, Rslv95, and Rslv96. The formula (39) employs EVslv97, which is common to the formula (34). The formula (40) employs EVslv98, which is common to the formula (35).

In the conditions (2-1) to (2-8), when the signal of the first peripheral pixel with the lowest level is less than the difference between the signal of the first peripheral pixel with the second lowest level and the parameter of the judgment slice level, the defect judging circuit 82 judges the first peripheral pixel with the lowest level as the black defect. In this case, the defect judging circuit 82 performs the black defect judgment on the target pixel using the signals of the second peripheral pixel and the third peripheral pixel instead of the first peripheral pixel with the lowest level.

For example, according to the condition (2-1), when the first peripheral pixel Rd0 has the lowest level and the signal thereof (Rd0) is less than the difference between the signal (Rd_s2) with the second lowest level and the judgment slice level (Rslv96), the defect judging circuit 82 specifies the second peripheral pixels Rf0, Rf1, and Rf3, and the third peripheral pixels Re0 and Re2 that are close to the Rd0.

The defect judging circuit 82 compares the level of the signal (Rc) of the target pixel and the level obtained by subtracting the judging slice level (Rslv95) from each signal (Rf0, Rf1, and Rf3) of the second peripheral pixels. The defect judging circuit 82 compares the level of the signal (Rc) of the target pixel and the level obtained by subtracting the judging slice level (Rslv94) from each signal (Re0 and Re2) of the third peripheral pixels. In any of these comparisons, if the signal (Rc) of the target pixel is less, the defect judging circuit 82 judges the target pixel as the black defect.

Methods of the black defect judgment according to the conditions (2-2) to (2-8) are similar to the method of the black defect judgment according to the condition (2-1). In this manner, the defect judging circuit 82 performs the black defect judgment on the target pixel except the first peripheral pixel judged as the defect.

In the case where the black defect flag (Bf) is asserted from the defect judging circuit 82, the defect correcting circuit 28 replaces the value of the signal (Rc) of the target pixel with the value of Rd_s2 from the signal level comparing circuit 24. Note that the defect correcting circuit 28 may replace the value of the signal of the target pixel judged as the black defect with the value of the signal other than the Rd_s2.

For example, the defect correcting circuit 28 may replace the value of the signal of the target pixel with the value of the Rd_s4 in a manner similar to the first embodiment. Note that since the pixel Rd_s1 is likely to be the black defect, the defect correcting circuit 28 uses the signal other than the Rd_s1 for the replacement of the target pixel in the fourth embodiment.

In the fourth embodiment, moreover, the signal processing circuit 80 can perform the accurate defect correction by enabling the highly accurate defect judgment on any subject image where various picture components can exist. Thus, the solid-state imaging device 5 provides the effect that the high-quality image can be obtained through the accurate defect correction.

Note that the defect correction in the fourth embodiment is performed on the premise that the number of pixels as the defect is one or less among the first peripheral pixels, one or less among the second peripheral pixels, and one or less among the third peripheral pixels, except the target pixel. If the target pixel is the defect, in the case where the number of defects is one or less in each of the first peripheral pixels, the second peripheral pixels, and the third peripheral pixels, the signal processing circuit 80 can perform the effective defect correction on the target pixel.

According to the fourth embodiment, the signal processing circuit 80 can perform the defect correction even in the circumstances where not just the target pixel but also one of the first peripheral pixel, the second peripheral pixel, and the third peripheral pixel are the defect. The signal processing circuit 80 can relieve the condition for the defect distribution as compared with the case where the number of pixels as the defect allowed in the pixel block is one in the premise of the defect correction. For example, by enabling to relieve the standard for the fault inspection during the manufacture, the yield of the solid-state imaging device 5 can be increased.

Moreover, in the fourth embodiment, the defect judging circuit 82 uses, in the defect judgment, the signal of the second peripheral pixel and the signal of the third peripheral pixel that are specified in accordance with the position of the first peripheral pixel except for the first peripheral pixel judged as the defect. The defect judging circuit 82 can perform the highly accurate defect judgment where the influence of the defect is eliminated. Thus, the signal processing circuit 80 can perform the more accurate defect correction.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A solid-state imaging device comprising:
    a pixel extracting circuit that extracts, from a pixel block with a target pixel as a center, a signal of the target pixel and signals of peripheral pixels as pixels for the same color as the target pixel;
    a signal level comparing circuit that compares levels among the signals of the peripheral pixels extracted by the pixel extracting circuit and outputs the signals of the peripheral pixels rearranged in the order of a signal level;
    a defect judging circuit that performs defect judgment on the target pixel in response to the signal of the target pixel and the signals of the peripheral pixels from the signal level comparing circuit; and
    a defect correcting circuit that performs defect correction on the target pixel in accordance with a result of the defect judgment in the defect judging circuit, wherein
    the pixel extracting circuit extracts each signal of first peripheral pixels as the peripheral pixels arranged with pixels for colors other than the color of the target pixel interposed between the first peripheral pixels and the target pixel, second peripheral pixels as the peripheral pixels disposed on extension lines in directions from the target pixel to the first peripheral pixels, and third peripheral pixels as the peripheral pixels disposed between the second peripheral pixels, and
    the signal level comparing circuit compares the levels among the signals of the first peripheral pixels, the levels among the signals of the second peripheral pixels, and the levels among the signals of the third peripheral pixels.

2. The solid-state imaging device according to claim 1, wherein the signal level comparing circuit includes
    a first signal level comparing circuit that compares the levels among the signals of the first peripheral pixels, and outputs the signals of the first peripheral pixels rearranged in the order of the signal level,
    a second signal level comparing circuit that compares the levels among the signals of the second peripheral pixels, and outputs the signals of the second peripheral pixels rearranged in the order of the signal level, and
    a third signal level comparing circuit that compares the levels among the signals of the third peripheral pixels, and outputs the signals of the third peripheral pixels rearranged in the order of the signal level.

3. The solid-state imaging device according to claim 2, wherein
the first signal level comparing circuit outputs the signal of the first peripheral pixel with the highest signal level,
the second signal level comparing circuit outputs the signal of the second peripheral pixel with the highest signal level,
the third signal level comparing circuit outputs the signal of the third peripheral pixel with the highest signal level, and
the defect judging circuit performs white defect judgment on the target pixel on the basis of a result obtained by comparing the signal of the target pixel, and the signals of the first peripheral pixel, the second peripheral pixel, and the third peripheral pixel with the highest signal level.

4. The solid-state imaging device according to claim 2, wherein
the first signal level comparing circuit outputs the signal of the first peripheral pixel with the lowest signal level,
the second signal level comparing circuit outputs the signal of the second peripheral pixel with the lowest signal level,
the third signal level comparing circuit outputs the signal of the third peripheral pixel with the lowest signal level, and
the defect judging circuit performs black defect judgment on the target pixel on the basis of a result obtained by comparing the signal of the target pixel, and the signals of the first peripheral pixel, the second peripheral pixel, and the third peripheral pixel with the lowest signal level.

5. The solid-state imaging device according to claim 2, wherein
the first signal level comparing circuit outputs the signal of the first peripheral pixel with the highest signal level,
the second signal level comparing circuit outputs the signal of the second peripheral pixel with the second highest signal level,
the third signal level comparing circuit outputs the signal of the third peripheral pixel with the second highest signal level, and
the defect judging circuit performs white defect judgment on the target pixel on the basis of a result obtained by comparing the signal of the target pixel, the signal of the first peripheral pixel with the highest signal level, and the signals of the second peripheral pixel and the third peripheral pixel with the second highest signal level.

6. The solid-state imaging device according to claim 2, wherein,
the first signal level comparing circuit outputs the signal of the first peripheral pixel with the lowest signal level,
the second signal level comparing circuit outputs the signal of the second peripheral pixel with the second lowest signal level,
the third signal level comparing circuit outputs the signal of the third peripheral pixel with the second lowest signal level, and
the defect judging circuit performs black defect judgment on the target pixel on the basis of a result obtained by comparing the signal of the target pixel, the signal of the first peripheral pixel with the lowest signal level, and the signals of the second peripheral pixel and the third peripheral pixel with the second lowest signal level.

7. The solid-state imaging device according to claim 2, wherein
the first signal level comparing circuit outputs the signal of the first peripheral pixel with the second highest signal level,
the second signal level comparing circuit outputs the signal of the second peripheral pixel with the second highest signal level,
the third signal level comparing circuit outputs the signal of the third peripheral pixel with the second highest signal level, and
the defect judging circuit performs white defect judgment on the target pixel on the basis of a result obtained by comparing the signal of the target pixel, and the signals of the first peripheral pixel, the second peripheral pixel, and the third peripheral pixel with the second highest signal level.

8. The solid-state imaging device according to claim 7, wherein if the signal of the first peripheral pixel with the highest signal level is greater than a sum of the signal of the first peripheral pixel with the second highest level and a judgment slice level, the defect judging circuit performs the white defect judgment on the target pixel on the basis of a result obtained by comparing the signal of the target pixel, and each signal of the second peripheral pixel and the third peripheral pixel that are specified in accordance with a position of the first peripheral pixel with the highest level.

9. The solid-state imaging device according to claim 2, wherein
the first signal level comparing circuit outputs the signal of the first peripheral pixel with the second lowest signal level,
the second signal level comparing circuit outputs the signal of the second peripheral pixel with the second lowest signal level,
the third signal level comparing circuit outputs the signal of the third peripheral pixel with the second lowest signal level, and
the defect judging circuit performs black defect judgment on the target pixel on the basis of a result obtained by comparing the signal of the target pixel, and the signals of the first peripheral pixel, the second peripheral pixel, and the third peripheral pixel with the second lowest signal level.

10. The solid-state imaging device according to claim 9, wherein if the signal of the first peripheral pixel with the lowest signal level is less than a difference between the signal of the first peripheral pixel with the second lowest level and a judgment slice level, the defect judging circuit performs the black defect judgment on the basis of a result obtained by comparing the signal of the target pixel, and each signal of the second peripheral pixel and the third peripheral pixel that are specified in accordance with a position of the first peripheral pixel with the lowest level.

11. A camera module comprising:
an imaging optical system that takes in light from a subject and forms a subject image; and
a solid-state imaging device that converts light taken in the imaging optical system into a signal charge and captures the subject image,
wherein the solid-state imaging device includes:
a pixel extracting circuit that extracts, from a pixel block with a target pixel as a center, a signal of the target pixel and signals of peripheral pixels as pixels for the same color as the target pixel;
a signal level comparing circuit that compares levels among the signals of the peripheral pixels extracted by the pixel extracting circuit and outputs the signals of the peripheral pixels rearranged in the order of a signal level;
a defect judging circuit that performs defect judgment on the target pixel in response to the signal of the target pixel and the signals of the peripheral pixels from the signal level comparing circuit; and
a defect correcting circuit that performs defect correction on the target pixel in accordance with a result of the defect judgment in the defect judging circuit, wherein
the pixel extracting circuit extracts each signal of first peripheral pixels as the peripheral pixels arranged with pixels for colors other than the color of the target pixel interposed between the first peripheral pixels and the target pixel, second peripheral pixels as the peripheral pixels disposed on extension lines in directions from the target pixel to the first peripheral pixels, and third peripheral pixels as the peripheral pixels disposed between the second peripheral pixels; and
the signal level comparing circuit compares the levels among the signals of the first peripheral pixels, the levels among the signals of the second peripheral pixels, and the levels among the signals of the third peripheral pixels.

12. The camera module according to claim 11, wherein the signal level comparing circuit includes
a first signal level comparing circuit that compares the levels among the signals of the first peripheral pixels, and outputs the signals of the first peripheral pixels rearranged in the order of the signal level,
a second signal level comparing circuit that compares the levels among the signals of the second peripheral pixels, and outputs the signals of the second peripheral pixels rearranged in the order of the signal level; and
a third signal level comparing circuit that compares the levels among the signals of the third peripheral pixels, and outputs the signals of the third peripheral pixels rearranged in the order of the signal level.

13. The camera module according to claim 12, wherein
the first signal level comparing circuit outputs the signal of the first peripheral pixel with the highest signal level,
the second signal level comparing circuit outputs the signal of the second peripheral pixel with the highest signal level,
the third signal level comparing circuit outputs the signal of the third peripheral pixel with the highest signal level, and
the defect judging circuit performs white defect judgment on the target pixel on the basis of a result obtained by comparing the signal of the target pixel, and the signals of the first peripheral pixel, the second peripheral pixel, and the third peripheral pixel with the highest signal level.

14. The camera module according to claim 12, wherein
the first signal level comparing circuit outputs the signal of the first peripheral pixel with the lowest signal level,
the second signal level comparing circuit outputs the signal of the second peripheral pixel with the lowest signal level,
the third signal level comparing circuit outputs the signal of the third peripheral pixel with the lowest signal level, and
the defect judging circuit performs black defect judgment on the target pixel on the basis of a result obtained by comparing the signal of the target pixel, and the signals of the first peripheral pixel, the second peripheral pixel, and the third peripheral pixel with the lowest signal level.

15. The camera module according to claim 12, wherein
the first signal level comparing circuit outputs the signal of the first peripheral pixel with the highest signal level,
the second signal level comparing circuit outputs the signal of the second peripheral pixel with the second highest signal level,
the third signal level comparing circuit outputs the signal of the third peripheral pixel with the second highest signal level, and
the defect judging circuit performs white defect judgment on the target pixel on the basis of a result obtained by comparing the signal of the target pixel, the signal of the first peripheral pixel with the highest signal level, and the signals of the second peripheral pixel and the third peripheral pixel with the second highest signal level.

16. The camera module according to claim 12, wherein
the first signal level comparing circuit outputs the signal of the first peripheral pixel with the lowest signal level,
the second signal level comparing circuit outputs the signal of the second peripheral pixel with the second lowest signal level,
the third signal level comparing circuit outputs the signal of the third peripheral pixel with the second lowest signal level, and
the defect judging circuit performs black defect judgment on the target pixel on the basis of a result obtained by comparing the signal of the target pixel, the signal of the first peripheral pixel with the lowest signal level, and the signals of the second peripheral pixel and the third peripheral pixel with the second lowest signal level.

17. The camera module according to claim 12, wherein
the first signal level comparing circuit outputs the signal of the first peripheral pixel with the second highest signal level,
the second signal level comparing circuit outputs the signal of the second peripheral pixel with the second highest signal level,
the third signal level comparing circuit outputs the signal of the third peripheral pixel with the second highest signal level, and
the defect judging circuit performs white defect judgment on the target pixel on the basis of a result obtained by comparing the signal of the target pixel, and the signals of the first peripheral pixel, the second peripheral pixel, and the third peripheral pixel with the second highest signal level.

18. The camera module according to claim 17, wherein if the signal of the first peripheral pixel with the highest signal level is greater than a sum of the signal of the first peripheral pixel with the second highest level and a judgment slice level, the defect judging circuit performs the white defect judgment on the target pixel on the basis of a result obtained by comparing the signal of the target pixel, and each signal of the second peripheral pixel and the third peripheral pixel that are specified in accordance with a position of the first peripheral pixel with the highest level.

19. The camera module according to claim 12, wherein
the first signal level comparing circuit outputs the signal of the first peripheral pixel with the second lowest signal level,
the second signal level comparing circuit outputs the signal of the second peripheral pixel with the second lowest signal level, the third signal level comparing circuit outputs the signal of the third peripheral pixel with the second lowest signal level, and the defect judging circuit performs black defect judgment on the target pixel on the basis of a result obtained by comparing the signal of the target pixel, and the signals of the first peripheral pixel, the second peripheral pixel, and the third peripheral pixel with the second lowest signal level.

20. The camera module according to claim 19, wherein if the signal of the first peripheral pixel with the lowest signal level is less than a difference between the signal of the first peripheral pixel with the second lowest level and a judgment slice level, the defect judging circuit performs the black defect judgment on the basis of a result obtained by comparing the signal of the target pixel, and each signal of the second peripheral pixel and the third peripheral pixel that are specified in accordance with a position of the first peripheral pixel with the lowest level.

* * * * *